United States Patent Office 2,713,599
Patented July 19, 1955

2,713,599
PRODUCTION OF TERTIARY AROMATIC ALCOHOLS

Eugene J. Lorand, Wilmington, Del., assignor to Hercules Powder Company, Wilmington, Del., a corporation of Delaware No Drawing. Application December 29, 1951,
Serial No. 264,235

11 Claims. (Cl. 260—618)

This invention relates to the preparation of tertiary alcohols and, more particularly, to a process involving the decomposition of tertiary hydroperoxides to the corresponding tertiary alcohols.

It is known that certain organic hydroperoxides can be converted to the corresponding alcohols through the use of various reducing agents. However, most of the reducing agents previously utilized by the art have been found wanting in certain respects, particularly with respect to their efficiency in effecting the desired reduction. Also, the reducing agents of the art, in general, have not been capable of use in alkaline medium. The latter fact has been particularly disadvantageous when it has been desired to reduce hydroperoxides which were unstable in acid medium.

It has now been found that improved yields of $\alpha,\alpha$-dialkylarylmethyl alcohols of the formula ROH, wherein R is a radical of the formula

where $R_1$ and $R_2$ represent alkyl groups and Ar represents an aryl or substituted aryl group, may be obtained by treating a hydroperoxide of the formula ROOH (wherein R is the same as above) with a hydrocarbon of the formula RH (where R is the same as above) in the presence of an alkali metal hydroxide under anhydrous conditions.

Tertiary alcohols are produced in accordance with this invention, for example, by treating a mixture of a tertiary hydroperoxide and its corresponding hydrocarbon, for example, $\alpha,\alpha$-dimethylbenzyl hydroperoxide and cumene, under anhydrous conditions with a base such as sodium hydroxide at a temperature of from about 80° C. to 200° C. By means of the reaction between these reagents there is produced $\alpha,\alpha$-dimethylbenzyl alcohol in quantities which substantially exceed the theoretical yield based upon the amount of hydroperoxide utilized.

The following examples constitute specfiic embodiments of the invention. All parts are on the basis of parts by weight.

Example 1

A reaction vessel fitted with a stirrer, a thermometer, a reflux condenser and an inlet tube for the introduction of nitrogen was charged with 37.5 parts cumene of greater than 99% purity and 12.5 parts of a cumene oxidation reaction mixture obtained by the air oxidation of cumene and containing 96.7% $\alpha,\alpha$-dimethylbenzyl hydroperoxide. The reaction charge was covered with a nitrogen atmosphere and heated to about 102° C. The reaction mixture was maintained at this temperature with agitation for a 45-minute period during which 0.7 part of solid sodium hydroxide was added. Agitation was continued for an additional 45-minute period at 97°–99° C. and samples of the reaction mixture were removed at regular intervals. The reaction product was found to contain 0.26% $\alpha,\alpha$-dimethylbenzyl hydroperoxide and 32.6% $\alpha,\alpha$-dimethylbenzyl alcohol. The yield of $\alpha,\alpha$-dimethylbenzyl alcohol represented a yield of 142% based upon the weight of hydroperoxide decomposed.

Example 2

Using the apparatus of Example 1, 45 parts cumene of greater than 99% purity and 15 parts of a cumene oxidation reaction mixture obtained by the air oxidation of cumene and containing 97.6% $\alpha,\alpha$-dimethylbenzyl hydroperoxide were charged to a reaction vessel and covered with nitrogen. To the reaction mixture was added 1 part of solid potassium hydroxide over a period of 0.7 hour while agitating the reaction mixture at 100° C. Agitation was continued for an additional 45 minute period at 100° C. and samples of the reaction mixture were removed at regular intervals. The reaction product was found to contain less than 0.3% $\alpha,\alpha$-dimethylbenzyl hydroperoxide. The yield of $\alpha,\alpha$-dimethylbenzyl alcohol amounted to 145% based upon the weight of hydroperoxide decomposed.

The process of this invention is applicable to any tertiary hydroperoxide of the formula

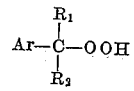

in which $R_1$ and $R_2$ are alkyl groups and Ar is an aryl or substituted aryl group. The hydroperoxides of this class may be described generally as $\alpha,\alpha$-dialkylarylmethyl hydroperoxides and may be prepared by the oxidation of $\alpha,\alpha$-dialkylarylmethanes having the structural formula

in which $R_1$, $R_2$ and Ar have the same meanings as above. Thus, cumene, p-cymene, p-diisopropylbenzene and isopropylnaphthalene may be oxidized to $\alpha,\alpha$-dimethylbenzyl-, $\alpha,\alpha$-dimethyl-p-methylbenzyl-, $\alpha,\alpha$-dimethyl-p-isopropylbenzyl- and $\alpha,\alpha$-dimethylnaphthyl hydroperoxides, respectively. In the case of p-diisopropylbenzene there may also be obtained $\alpha,\alpha,\alpha',\alpha'$-tetramethyl-p-xylylenedihydroperoxide. The oxidation may be carried out in the liquid phase utilizing air or molecular oxygen as the oxidizing agents. A preferred method of preparing these hydroperoxides involves the liquid phase oxidation of the alkyl-substituted aromatic organic compounds having the above structural formula by passing an oxygen-containing gas through the compounds at a temperature between about 50° C. and about 150° C. in the presence of an aqueous alkali. The concentration of the alkali may be between about 0.01% and about 40% based upon the weight of hydroperoxide, although it is preferable to use concentrations of about 1% to about 15%. Vigorous agitation is desirable during the oxidation reaction.

The $\alpha,\alpha$-dialkylarylmethyl hydroperoxides which are caused to react with $\alpha,\alpha$-dialkylarylmethanes in accordance with this invention for the production of the corresponding tertiary alcohols may have the same or different structure from that of the $\alpha,\alpha$-dialkylarylmethanes. The examples have shown the reaction in which the $\alpha,\alpha$-dialkylarylmethyl radical is the same for both the hydroperoxide and the hydrocarbon. The reaction may also be carried out between hydroperoxides and hydrocarbons having dissimilar radicals, for instance, $\alpha,\alpha$-dimethyl-p-methylbenzyl hydroperoxide may be contacted with cumene, or $\alpha,\alpha$-dimethylbenzyl hydroperoxide may be contacted with cymene under the conditions of this invention to produce a mixture of $\alpha,\alpha$-dimethyl-p-methylbenzyl alcohol and $\alpha,\alpha$-dimethylbenzyl alcohol, and the net result of the reaction is that both hydroperoxide and hydrocarbon are converted to the corresponding α,α-dialkylarylmethyl alcohol.

The formulas

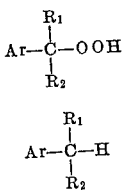

and

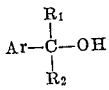

have been applied broadly to the hydroperoxide, hydrocarbon, and alcohol concerned in the present invention. In these general formulas Ar represents an aryl or substituted aryl group and includes aryl and alkaryl groups derived from benzene, naphthalene, anthracene, phenanthrene, and the like. The aryl group may be substituted with alkyl groups such as methyl, ethyl, propyl, isopropyl, butyl, isobutyl, secondary butyl, tertiary butyl, etc., to give alkaryl groups, the same alkyl groups also being representative of $R_1$ and $R_2$ in the structural formula. $R_1$ and $R_2$ may be the same or different. For example, compounds such as α,α-dimethylbenzyl-, α,α-dimethyl-p-methylbenzyl-, and α,α-dimethyl-p-isopropylbenzyl hydroperoxides may be treated with the corresponding hydrocarbons in accordance with this invention to produce the corresponding alcohols. Similarly dihydroperoxides such as α,α,α',α'-tetramethyl-p-xylene dihydroperoxide may be converted to α,α,α',α'-tetramethyl-p-xylylenediol. Also, the aryl group may be substituted with nonhydrocarbon groups such as nitro, halogen, alkoxy, cyano, etc., groups as in the case of nitrophenyl, chlorophenyl, methoxyphenyl, cyanophenyl, nitronaphthyl, chloronaphthyl, methoxynaphthyl, cyanonaphthyl, etc.

The process of this invention may be carried out either with a purified hydroperoxide and a pure hydrocarbon or it may be carried out using a partially oxidized hydrocarbon rich in hydroperoxides. When desirable, the hydroperoxide may be separated from the other constituents of the reaction mixture by, for example, fractional distillation at very low pressures, of the order of 0.01 to 1.0 mm./sq. cm., the hydroperoxides having higher boiling points than the related hydrocarbon, alcohol, and ketone. In certain instances the hydroperoxide also may be separated from the oxidation reaction mixture by crystallization, which may be facilitated by first distilling off part of the hydrocarbon.

The process of the present invention may be applied to a partially oxidized hydrocarbon with or without dilution or relatively pure hydroperoxide may be diluted with hydrocarbon. When a partially oxidized hydrocarbon is added to a hydrocarbon containing an alkali metal hydroxide catalyst, a higher yield of alcohol is obtained, rendering such a process preferable to a process wherein a catalyst is simply added to a partially oxidized hydrocarbon without dilution. The latter process is quite satisfactory, however. It will be apparent that the hydroperoxides can be prepared by any satisfactory procedure and then be added to the hydrocarbon which it is desired to convert to the alcohol, or the hydrocarbon can be partially oxidized to hydroperoxide and the mixture added to fresh hydrocarbon in the presence of catalyst. The present process of reacting an α,α-dialkylarylmethyl hydroperoxide with an α,α-dialkylarylmethane in the presence of an alkali metal hydroxide catalyst gives a lower proportion of by-products and a substantially greater yield of alcohol based on the hydroperoxide than any of the prior art processes.

The catalysts of this invention are those materials which are known in the chemical art as alkali metal hydroxides such as sodium, potassium, and lithium hydroxide. These catalysts are preferably utilized in powdered form, but may also be used in any other anhydrous condition. They may be used in concentrations varying from about 0.1% to about 40% based upon the weight of hydroperoxide, but it is preferred that about 2 to 15% base with respect to the weight of the hydroperoxide be utilized.

The process of this invention is carried out under anhydrous conditions. It has been found that under conditions other than anhydrous the formation of by-products such as ketones is favored, thereby substantially reducing the efficiency of the process. The temperature of the reaction may be varied from about 80° C. to 200° C., but temperatures of 90° to 110° C. are most desirable as resulting in the highest yields of alcohol with the least attendant production of by-products. Both batch and continuous operations may be utilized.

It is desirable from time to time to check the hydroperoxide content in the reaction mixture. This can be carried out utilizing the well-known iodine liberation method which involves removal of a sample of the reaction mixture from the reaction vessel and adding this sample to an acidified potassium iodide solution and noting the amount of iodine which is liberated. Upon completion of the reaction, the hydroperoxide content should not exceed a rather low limit which will vary depending upon the nature of the hydroperoxide, but generally falls within the range of 0 to about 3%. Upon completion of the reduction the reaction mixture may be worked up by well-known procedures.

The process in accordance with this invention provides an efficient and economical means for the preparation of alcohols. It is particularly useful in those instances in which the alcohols have been difficultly obtained by other processes. By oxidizing a hydrocarbon and proceeding with the partial oxidation reaction mixture, it is possible, using the process of this invention, to obtain the alcohol more easily, more economically, and in higher yields than would otherwise be possible.

The products obtained according to this invention find various commercial applications. For example, α,α-dimethyl-p-methylbenzyl alcohol is used in the essential oil industry as a perfume base for soaps. This compound also is an efficient frothing agent in the flotation of copper, zinc, and lead sulfide ores. α,α-Dimethylbenzyl alcohol has similar commercial applications. The dihydric alcohols such as those derived from diisopropylbenzene also are efficient frothing agents in heavy metal, especially lead sulfide, ore flotations. All of the alcohols are good wetting-out agents.

What I claim and desire to protect by Letters Patent is:

1. The process which comprises treating a mixture containing a hydrocarbon of the formula RH and a hydroperoxide of the formula ROOH with an alkali metal hydroxide under anhydrous conditions at a temperature between about 80° and about 200° C. until said hydroperoxide his substantially completely reacted, to produce an alcohol of the formula ROH as the major product, the R in said formulas being a radical of the formula

where $R_1$ and $R_2$ represent alkyl groups and Ar represents a radical of the group consisting of aryl and substituted aryl radicals.

2. The process of claim 1 carried out at from about 90° C. to 110° C.

3. The process of claim 1 wherein the alkali metal hydroxide is sodium hydroxide.

4. The process of claim 1 wherein the alkali metal hydroxide is potassium hydroxide.

5. The process of claim 1 wherein the alkali metal hydroxide is lithium hydroxide.

6. The process of claim 1 wherein the hydrocarbon is p-cymene, the hydroperoxide is $\alpha,\alpha$-dimethyl-p-methylbenzyl hydroperoxide, and the alcohol is $\alpha,\alpha$-dimethyl-p-methylbenzyl alcohol.

7. The process of claim 1 wherein the hydrocarbon is p-diisopropylbenzene, the hydroperoxide is $\alpha,\alpha$-dimethyl-p-isopropylbenzyl hydroperoxide, and the alcohol is $\alpha,\alpha$-dimethyl-p-isopropylbenzyl alcohol.

8. The process of claim 1 wherein the hydrocarbon is cumene, the hydroperoxide is $\alpha,\alpha$-dimethylbenzyl hydroperoxide, and the alcohol is $\alpha,\alpha$-dimethylbenzyl alcohol.

9. The process of claim 8 carried out at 90° C. to 110° C.

10. The process of claim 9 wherein the alkali metal hydroxide is sodium hydroxide.

11. The process of claim 9 wherein the alkali metal hydroxide is potassium hydroxide.

References Cited in the file of this patent

UNITED STATES PATENTS

| | | |
|---|---|---|
| 2,438,125 | Lorand et al. | Mar. 23, 1948 |
| 2,447,400 | Emerson | Aug. 17, 1948 |
| 2,447,414 | Kosmin et al. | Aug. 17, 1948 |
| 2,632,774 | Conner, Jr. et al. | Mar. 24, 1953 |

OTHER REFERENCES

Kharasch et al.: Journ. Organic Chemistry, vol. 16 (January 1951), pp. 113–127 (15 pp.).